(12) United States Patent
Bertoni et al.

(10) Patent No.: US 9,344,506 B2
(45) Date of Patent: May 17, 2016

(54) METHOD FOR THE MANAGEMENT OF PARAMETERS FOR THE DELIVERY OF SPONTANEOUS CONTENTS, METHOD FOR THE DELIVERY OF SPONTANEOUS CONTENTS, METHOD FOR PROVIDING SPONTANEOUS CONTENTS, ASSOCIATED TERMINAL AND REMOTE SYSTEMS

(75) Inventors: Yves Bertoni, Nozay (FR); Stéphane Betge Brezetz, Nozay (FR); Yann Toms, Nozay (FR)

(73) Assignee: Alcatel Lucent, Boulogne-Billancourt (FR)

( * ) Notice: Subject to any disclaimer, the term of this patent is extended or adjusted under 35 U.S.C. 154(b) by 1576 days.

(21) Appl. No.: 12/469,478

(22) Filed: May 20, 2009

(65) Prior Publication Data

US 2009/0292771 A1  Nov. 26, 2009

(30) Foreign Application Priority Data

May 22, 2008  (FR) ..................................... 08 02790

(51) Int. Cl.
*G06F 15/16* (2006.01)
*H04L 29/08* (2006.01)

(52) U.S. Cl.
CPC .............. *H04L 67/22* (2013.01); *H04L 67/26* (2013.01); *H04L 67/325* (2013.01)

(58) Field of Classification Search
USPC ........ 709/217; 705/14.49; 455/456.3; 725/97
See application file for complete search history.

(56) References Cited

U.S. PATENT DOCUMENTS

| 7,418,503 | B2 * | 8/2008 | Zellner et al. ................. 709/225 |
| 2002/0077130 | A1 | 6/2002 | Owensby |
| 2002/0199010 | A1 * | 12/2002 | Ruse et al. .................... 709/232 |
| 2003/0149738 | A1 * | 8/2003 | Jacobs et al. .................. 709/217 |
| 2006/0195570 | A1 * | 8/2006 | Zellner et al. ................. 709/224 |
| 2007/0022438 | A1 * | 1/2007 | Arseneau et al. ............... 725/45 |
| 2010/0287479 | A1 | 11/2010 | Pell et al. |
| 2010/0291907 | A1 * | 11/2010 | MacNaughtan et al. ... 455/414.1 |
| 2010/0325666 | A1 * | 12/2010 | Wiser et al. .................... 725/44 |

FOREIGN PATENT DOCUMENTS

| JP | 2000-20418 | 1/2000 |
| JP | 2003284147 A | 10/2003 |
| JP | 2005006309 A | 1/2005 |
| JP | 2005236938 A | 9/2005 |
| JP | 2008-20351 | 1/2008 |

* cited by examiner

*Primary Examiner* — Abdullahi E Salad
(74) *Attorney, Agent, or Firm* — Fay Sharpe LLP

(57) ABSTRACT

When managing of a set of parameters for the delivery of spontaneous contents to a user of a terminal, at least one content is delivered to the user, a determination is made as to whether the user generates on his/her terminal a reaction that is favorable or otherwise to the content delivered. Within the set of parameters for delivery of the spontaneous contents, at least one parameter representing the said reaction on the part of the user, and at least one contextual parameter associated to the said content delivered are stored to memory so as to adapt the said set of parameters, and a schedule is established via the terminal to deliver at least one spontaneous content selected based on the said adapted set of parameters so as to determine an appropriate moment to deliver the said selected content.

10 Claims, 2 Drawing Sheets

Figure 1:
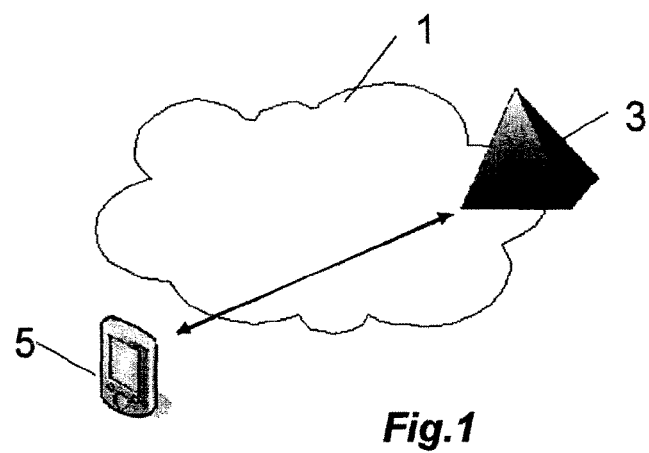

METHOD FOR THE MANAGEMENT OF PARAMETERS FOR THE DELIVERY OF SPONTANEOUS CONTENTS, METHOD FOR THE DELIVERY OF SPONTANEOUS CONTENTS, METHOD FOR PROVIDING SPONTANEOUS CONTENTS, ASSOCIATED TERMINAL AND REMOTE SYSTEMS

The invention concerns a method for the management of a set of parameters for the delivery of spontaneous contents.

The invention further concerns a method for the delivery of spontaneous contents.

The invention also concerns a method for transmission or broadcast over a spontaneous contents network.

Moreover, the invention concerns a terminal and a remote system suitable to deliver spontaneous contents for the implementation of such methods.

"Network" shall mean any type of fixed or mobile network (e.g. of the GSM, GPRS, UMTS or WLANs, or even an Internet or cable network) capable of transmitting, by means of wires or wirelessly, contents to terminals which are coupled to said network, and to exchange data or messages with those same terminals.

Any content transmission mode may be considered, particularly peer-to-peer (or "unicast") mode, point-to-multipoint (or "multicast") mode, or broadcast mode.

Furthermore, in this case "terminal" shall mean any type of equipment capable of receiving content from a network of the aforementioned type, and of exchanging data, messages and requests with said network.

It may, for example, be a land-line or mobile telephone, a personal digital assistant (or PDA), an encrypted video or television program decoder, a set-top television program receiving device, a video or music program receiving device, a desktop or portable computer, or a vehicle on-board device (such as a car, truck, bus, train, or other).

Moreover, in this case "spontaneous content" shall mean sets of data that define a video, or audio (radio broadcast or musical) or multimedia program, or alternatively an electronic data file whose broadcast is not necessarily the result of a request by the terminal user.

Such spontaneous content may be delivered independently, in aggregate with another content or else in association with an application.

Spontaneous content transmission systems are known that use e.g. traditional means of communication such as TV, radio, or even newspapers or magazines.

Also known are content transmission systems with means of communication such as faxes, or else the SMS [for "Short Message Service"] technology in mobile telephony.

However, spontaneous content is transmitted to users in a random manner without answering a need expressed by the user, and this, regardless of timing.

Moreover, in order to reach a great number of users, spontaneous content providers transmit contents assumed to match the greatest user subset both in terms of the content format used and of the information itself.

Indeed, the user does not always have the option to indicate preferences concerning spontaneous contents to be received.

Besides, spontaneous content can be transmitted to a user without his/her prior agreement.

Therefore, users may not be receptive to the spontaneous contents transmitted, thus reducing the efficacy of such transmission of spontaneous contents.

The purpose of the invention is therefore to improve known spontaneous content services, by making it possible, at a favorable moment, to present content to the users, said content being personalized and adapted to each user.

For this purpose, the invention has as its objective a method for the management of a set of parameters for the delivery of spontaneous contents to a user of a terminal comprising the following stages:
 at least one content is delivered to the user,
 a detection is performed as to whether the user generates on his/her terminal a reaction that is favorable or otherwise to the content delivered,
 within the set of parameters for delivery of the spontaneous contents, at least one parameter representing the said reaction on the part of the user, and at least one contextual parameter associated to the said content delivered are memorized so as to adapt the said set of parameters,
 a schedule is established via the terminal to deliver at least one spontaneous content selected based on the said adapted set of parameters so as to determine an appropriate moment to deliver the said selected content.

Advantageously, the method comprises a stage at which at least one quantitative information concerning the user's reactions is generated so as to establish an activity report for the user.

The invention also concerns a method for the delivery of spontaneous contents to a user of a terminal, implemented by the terminal and comprising the following stages:
 a moment is identified to deliver a spontaneous content,
 an available spontaneous content is selected based on a set of parameters comprising at least one parameter that is representative of a reaction on the part of the user regarding a content delivered, and at least one contextual parameter associated to the said content delivered, and
 the said selected content is delivered at the identified moment.

Preferably, the method comprises a stage at which information concerning the identification of a moment to deliver a spontaneous content is transmitted, so as to receive spontaneous contents to be delivered.

In a preferred embodiment, a moment is identified to deliver a spontaneous content based on a schedule to deliver at least one spontaneous content, and wherein the information concerning the identification of the said moment is transmitted before the identified moment.

In an advantageous variant, powering up of the terminal is monitored, in order to identify at least one moment to deliver a spontaneous content.

Alternatively, a terminal's telecommunication activity is monitored, in order to identify at least one moment to deliver a spontaneous content.

The invention further concerns a method for the transmission over a network of spontaneous contents, comprising the following stages:
 Preferably, information concerning the identification of a moment to deliver a spontaneous content is received, the said information being transmitted before the identified moment.
 at least one parameter out of a set of parameters for the delivery of spontaneous contents is received,
 a spontaneous content is selected based on the said received parameters, and
 the selected spontaneous content is transmitted.

The invention also concerns a communication terminal comprising at least one processing means for:
 delivery of at least one content,
 detection as to whether the user generates on his/her terminal a reaction that is favorable or otherwise to the content delivered, memorization, within a set of parameters for delivery of the spontaneous contents, of at least one parameter representing the said reaction on the part of the user, and of at least one contextual parameter associated to the said content delivered so as to adapt the said set of parameters, definition of a schedule to deliver at least one spontaneous content selected based on the said adapted set of parameters so as to determine at least one appropriate moment to deliver the said selected content.

The invention also concerns a communication terminal of a network comprising at least one processing means for:

identification of a moment to deliver a spontaneous content, selection of an available spontaneous content selected based on a set of parameters comprising at least one parameter that is representative of a reaction on the part of the user regarding a content delivered, and at least one contextual parameter associated to the said content delivered, and delivery of the said selected content at the identified moment.

Furthermore, the invention also concerns a remote system suitable to deliver spontaneous contents comprising at least one processing means for:

receiving information concerning the identification of a moment to deliver a spontaneous content is received, the said information being transmitted before the identified moment, receiving at least one parameter out of a set of parameters for the delivery of spontaneous contents, selecting a spontaneous content based on the said received parameters, and transmitting, over a network, the selected spontaneous content.

Figure 4:
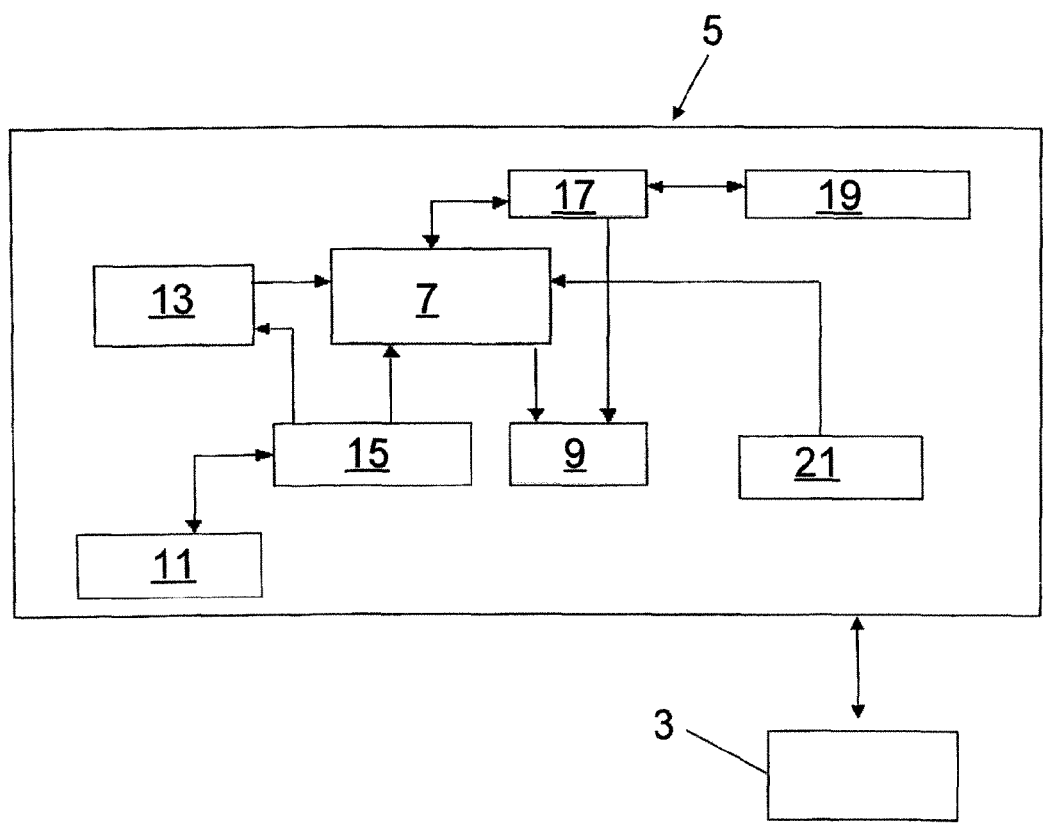
Figure 2A:
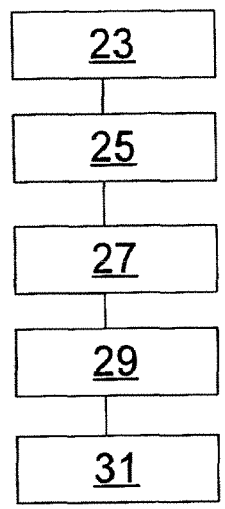
Figure 2B:
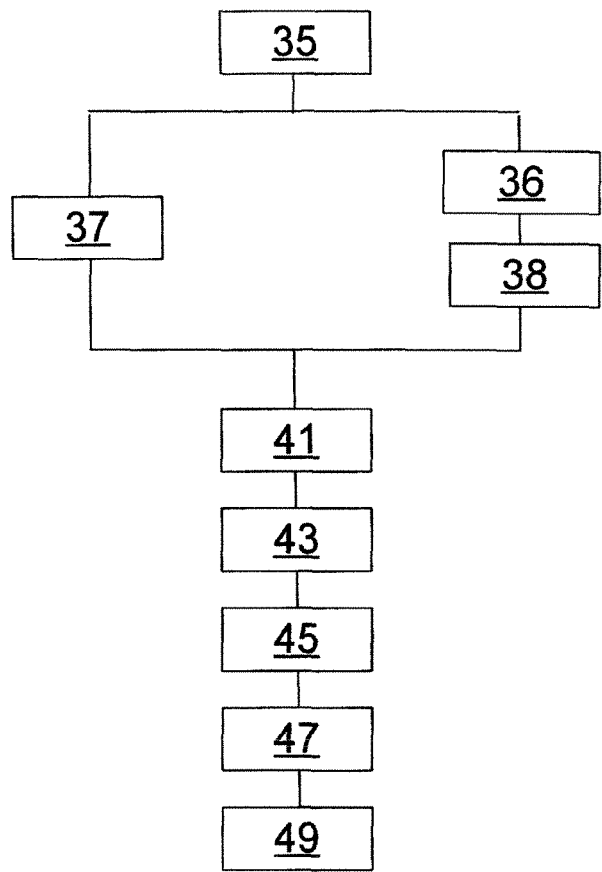
Figure 3:
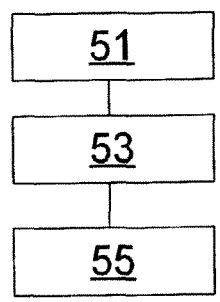

Other characteristics and advantages of the invention shall become apparent upon examining the following description below, provided by way of example but not of limitation, in view of the attached drawings, on which:

FIG. 1 schematically illustrates the general context for the implementation of a method for the management of a set of parameters for the delivery of a spontaneous content according to the invention, of a method for the delivery of spontaneous contents according to the invention, and of a method for the transmission of spontaneous contents on a network according to the invention, FIG. 2*a* represents the sequential stages of a method for the management of a set of parameters for the delivery of a spontaneous content according to the invention, FIG. 2*b* represents the sequential stages of a method for the delivery of spontaneous contents according to the invention, FIG. 3 represents the sequential stages of a method for the transmission of spontaneous contents over a network according to the invention, and FIG. 4 represents a sample embodiment for the implementation of such methods.

In the following description, references 1 to 21 relate to a terminal and a remote system suitable for the delivery of spontaneous contents for the implementation of a method for the management of a set of parameters to deliver spontaneous contents, of a method for the delivery of spontaneous contents, and of a method for the provision of spontaneous contents, while references 23 to 55 refer to the stages of the said different methods.

In order to illustrate the general context of the invention, FIG. 1 represents a fixed or mobile telecommunications network 1 (for example of the GSM, GPRS, UMTS, or WLAN type, or an Internet or a cable network).

Network 1 can be any type of network capable of transmitting content, by means of wires or wirelessly, to terminals which are coupled to said network, and to exchange data or messages with those same terminals.

Any content transmission mode may be considered, particularly peer-to-peer (or "unicast") mode, point-to-multipoint (or "multicast") mode, or broadcast mode.

A remote System 3 capable of supplying spontaneous contents is linked to Network 1 and through it transmits spontaneous contents e.g. under the form of flows addressed at Terminals 5 capable of receiving and displaying, e.g. on a screen, the spontaneous contents transmitted.

The spontaneous content transmitted via Network 1 may be a video, or audio (radio broadcast or musical) or multimedia program, or alternatively an electronic data file whose broadcast is not necessarily the result of a request by the user of Terminal 5.

The spontaneous content is e.g. an advertising or else informational content.

Such spontaneous content may be delivered independently, in aggregate with another content or else in association with an application.

Terminal 5 may be e.g. a fixed or mobile phone, a personal digital assistant (or PDA), equipment for the reception of audio or video programs, or a fixed or laptop PC, or even equipment built into a vehicle (car, truck, bus, train, and similar).

Generally speaking, Terminal 5 can be any type of terminal that is personal to a user or capable of identifying a user among a set of users.

Terminal 5 is in any event capable of exchanging data, messages and requests with Network 1 and, in particular, with System 3.

Within that general context it is proposed, with a view to improving the pertinence of spontaneous contents presented to a user:

a method for the management of a set of parameters for the delivery of spontaneous contents, which shall serve to supplement parameters configured by the user with discovered parameters so as always best to correspond to the user, and in a manner such as to anticipate favorable moments to deliver spontaneous contents to the user, a method for the delivery of spontaneous contents, enabling determination of the content to be delivered and detection of the moment of delivery, taking advantage of the set of parameters for the delivery of spontaneous contents, and a method for the transmission of spontaneous contents over a network, which will enable provision to the terminal of spontaneous contents, customized and adapted to the user, to be delivered, so that the terminal may record such spontaneous contents, and deliver them at a propitious moment.

First, the procedures according to the invention will be described, followed by the means enabling their implementation.

Method for the Management of a Set of Parameters for the Delivery of Spontaneous Contents:

In regard to FIG. 1*a*, the method for the management of a set of parameters for the delivery of spontaneous contents according to the invention will now be described.

The set of parameters for the delivery of spontaneous contents may comprise the following:

personal information concerning the user, such as his/her habits, agenda or activities, or qualitative information concerning spontaneous content to be delivered, such as the user's preferences concerning a consumption area, a product category, or a se of brands, or quantitative information concerning spontaneous contents to be delivered, or else temporal information to define favorable moments for the delivery of spontaneous contents.

Moreover, such parameters for the delivery of spontaneous contents may be enriched with information concerning the technical characteristics of Terminal 5, so that the spontaneous contents presented to the user take full advantage of the technical characteristics of Terminal 5.

"Technical characteristics" shall mean hardware characteristics such as a screen, its size, its resolution or number of colors, or else loudspeakers, but also software characteristics such as applications or even the operating system.

In fact, some of these technical hardware or software characteristics may enable the Terminal 5 to receive spontaneous contents in a particular format that may not be compatible with all terminals.

Consequently, the formats of the spontaneous contents are no longer limited and common to all terminals, but adapted to each terminal, e.g. by adjusting the size of the spontaneous content and by choosing a format the terminal is capable of utilizing.

The said set of parameters for the delivery of spontaneous contents shall preferentially be configured by the user or even imported, and can be adapted so as to enable better to target the spontaneous contents to be delivered to the user.

For this purpose, and as will be seen further on in this description, the user's reaction in regard to a content proposed to him/her is taken into account. The proposed content may be an audiovisual content, e.g. television or radio programs, or even games.

Moreover, the said set of parameters for the delivery of spontaneous contents is recorded in means of memorization that comprise a ROM so as to be preserved over the long term.

In a first Stage 23, at least one content is delivered to the user of a Terminal 5 in order to examine his/her reaction in regard to such content.

For this purpose, a detection is performed at Stage 25 as to whether the user generates on his/her terminal a reaction that is favorable or otherwise to the content delivered, The user's reaction is then translated to a representative parameter at Stage 27.

A favorable reaction is considered to be a reaction that translates an interest of the user in regard to the content delivered.

Such favorable reaction may e.g. be the authorization to display the content delivered.

In addition, an unfavorable reaction is considered to be an absence of reaction or a reaction prohibiting or deleting the display of the content delivered by means of a voluntary action on the part of the user.

Advantageously, further to the user's reaction, at least one contextual parameter is associated to the content delivered, to determine, for example, a new interest on the part of the user.

The contextual parameters may comprise information concerning the description of the content delivered, data concerning the classification of the content delivered, the geographic location of Terminal 5, or even at least one temporal information such as the season, the day or time when the content was delivered.

The parameters representing reactions of the users that are favorable or otherwise and the contextual parameters are then recorded in the set of parameters to deliver spontaneous contact so as to adapt the set of parameters to the user's discovered interests. The set of parameters for the delivery of spontaneous contents thus regularly evolves so as always to be adapted and customized to the user over time.

In fact, it can be imagined that the user's interests vary for example between the early winter and the end of spring, but also as a function of the user's activities.

By means of that set of parameters for the delivery of spontaneous content, whether configured by the user or adapted as set forth above, at Stage 29 a schedule is established to deliver at least one selected spontaneous content.

As a variant, it is possible to provide that the schedule would be established based on the observation of exchanges on the network and the utilization of radio resources, e.g. over a period of one day.

The schedule thus enables determination of propitious moments for the delivery of spontaneous contents to the user.

Such scheduling is internal to the terminal, which enables better respect of the user's private life. In addition, the user can configure the parameters of such scheduling to maintain a certain degree of control over the contents delivered to him/her.

It has proven to be advantageous to provide for a Stage 31, wherein at least one quantitative information concerning the user's favorable reactions in regard to a content delivered to him/her is generated.

This can be e.g. the number of times the user has accepted that a content be delivered to him/her, which makes it possible to know the number of contents delivered to the user and that have generated an interest in him/her.

Such quantitative information can be synthesized in the form of an activity report of Terminal 5, e.g. based on a predetermined time interval.

The activity report of Terminal 5 is then sent to the System 3, e.g. on a periodic basis.

The said activity report makes it possible to report the user's reactions and the actual presentation of the contents, which in turn renders it possible to bill the content providers.

It will therefore be understood that with a method of this kind the management set of parameters for the delivery of spontaneous contents is adapted in an evolutionary manner, so as always best to correspond to the user.

Thus, the parameters of that set of parameter can act as criteria to select spontaneous contents to be delivered that are personalized and adapted to the user, and at a favorable moment in time.

Of course, it will easily be understood that the order of implementation of the stages of this method for the management of a set of parameters to deliver spontaneous contents can, for certain stages, be inverted without departing from/running counter to/defeating the purpose of the spirit of the present invention.

Method for the Delivery of Spontaneous Contents:

The method for the management of a set of parameters for the delivery of spontaneous contents being a necessary preliminary, this description will now address, by reference to FIG. 1b, the method for the delivery of spontaneous contents according to the invention, which takes full advantage of the dynamic adaptation of a set of parameters for the delivery of spontaneous contents as described above.

This method implemented by the user's terminal enables delivery of a spontaneous content personalized and adapted to the user, and this at a moment that is suitable to catch the user's attention, thus increasing the efficacy of the spontaneous content delivered.

For this purpose, for the implementation of a method of this kind, access is available to any parameter of a set of parameters to deliver spontaneous contents configured by the user, imported, or adapted, e.g. according to a method for the management of a set of parameters for the delivery of spontaneous contents as described above.

In a first Stage 35, a moment is identified to deliver a spontaneous content.

To do so, advantageously a schedule to deliver at least one spontaneous content, defined as specified above, is analyzed.

In that case, when a propitious moment is anticipated on the basis of the schedule, a stage can be provided for wherein before the identified moment information concerning the identification of a moment to deliver a spontaneous content intended for the System 3 is transmitted. Such information can be transmitted in the form of a slot availability event.

Advantageously, any useful parameter out of the set of parameters for the delivery of spontaneous contents is transmitted to the System 3 to select and send a spontaneous content to the user.

Thereafter, a spontaneous content sent by the System 3 is received, then the spontaneous content received is recorded, e.g. in memorization means 19 of Terminal 5, so as to be able rapidly to deliver such content at the anticipated propitious moment.

As a variant, the software or hardware activity of Terminal 5 is monitored, in order to identify a moment to deliver a spontaneous content, For example, it would be possible to monitor the powering up of the Terminal 5. In that case, the identification of the moment for the delivery of a spontaneous content is advantageously inhibited during a predefined time interval, preferably over rest periods, for example at night, so as not to disturb the user during his/her sleep.

According to another embodiment, the telecommunication activity of the Terminal 5 is monitored, in order to identify a moment to deliver a spontaneous content.

Preferably, such telecommunication activity will be an uplink or downlink transmission activity enabling detection of an incoming or outgoing call, a peer-to-peer communication session established, or indeed the beginning and/or the end of a call or communication session of this type.

At the moment identified to deliver a spontaneous content according to one of the methods presented above, an available spontaneous content is selected at Stage 37.

For this purpose, any useful parameter out of the set of parameters for the delivery of spontaneous content that is pertinent in order to select a personalized content adapted to the user is taken into consideration.

Alternatively, it is also possible to take into account the utilization data of Terminal 5. In fact, when an incoming or outgoing call is made, the spontaneous content must be selected with a specific format.

Then, at Stage 41, the selected content is delivered at the identified moment.

According to a first embodiment, the available spontaneous content is selected from among contents recorded in the Memorization Means 19 at Terminal 5, for example further to the anticipation of a propitious moment for the deliver of the spontaneous content, and therefore further to advance receipt of spontaneous contents sent by the System 3.

According to a second embodiment, when there are no recorded spontaneous contents, information concerning the identification of a moment to deliver a spontaneous content is transmitted to the System 3; this is Stage 36. Such information can be transmitted in the form of a slot availability event.

Provision can also be made for transmission of one or several parameters out of the set of parameters for the delivery of spontaneous contents to the System 3 to select a spontaneous content adapted to the user.

At Stage 38, System 3:

receives the information concerning the identification of a moment to deliver a spontaneous content and at least one parameter out of the set of parameters for the delivery of spontaneous contents that is appropriate to select a spontaneous content.

selects a spontaneous content to be presented to the user based on the parameters received, and sends the selected content to the Terminal 5.

Following the said Stage 38, the said spontaneous content is received, and the available spontaneous content received at Stage 41 is delivered.

Thus, the spontaneous contents are personalized and delivered to the user at the right moment, so that the contents delivered will be likely to be of interest to the user.

Furthermore, in order to produce a rapid reaction when the user is interested by a spontaneous content delivered to him/her, an interaction on the part of the user is detected by means of the spontaneous content that has been delivered, and then information concerning the user's interaction is transmitted to the System 3; this is Stage 43.

System 3 then receives and analyses the said information in order to provide the appropriate service.

Such interaction may e.g. be the activation of a key on a keyboard of Terminal 5 whose number corresponds to a number of a proposed choice, or indeed the selection of an active element of the content delivered when it is displayed.

It is thus possible to imagine that the user may select an active key denominated e.g. "More information" that would enable reception of additional data in connection with the spontaneous content delivered, or else that the user may select an active key enabling the establishment of a communication with the advertiser of the spontaneous content, e.g. by e-mail or by means of a telephone call. In the following example, it is considered that the user selects a key denominated "More information".

In that case, the information sent may be a request for the transmission of at least one additional data item in relation to a spontaneous content that has been delivered, and associated to the selection of the "More information" key.

Thanks to this transmitted information, the System 3 selects at least one supplementary data item, and then sends such additional data item to the Terminal 5.

Such supplementary data item may be selected from the list comprising an image, characters, a link towards a website, or even a multimedia content, for example by using the streaming technology.

In order to enable the user to control the reception of incoming data, a supplementary incoming data item is detected at Terminal 5; this is Stage 45.

It is then possible, at Stage 47, to inform the user to enable him/her to accept or refuse receipt of such supplementary incoming data item.

When reception is accepted, the supplementary data item is delivered at Stage 49.

Thus, at each interaction of the user with a spontaneous content delivered to him/her, a method of this kind enables sequential transmission of contents to meet the user's expectations.

It will also be understood that with a method of this kind, the spontaneous contents to be delivered to the user are selected so as to be appropriate for that user, and the interactions between the user of Terminal 5 and the System 3 are managed at the Terminal 5 in a manner such as to enable the user to have a certain degree of control over the contents and data proposed to him/her.

Of course, it will easily be understood that the order of implementation of certain stages of this method for the delivery of spontaneous contents can also be inverted without running counter to the purpose of the spirit of the present invention.

Method for Transmission of Spontaneous Contents Over a Network:

In order to be able to deliver spontaneous content according to the method described above, such content must be available, e.g. at Terminal 5.

In order for Terminal 5 to be always sufficiently supplied with personalized spontaneous contents adapted to the user, hereafter a method for the transmission of spontaneous contents over a Network 1 according to the invention is proposed by reference to FIG. 3.

A method of this kind enables System 3 regularly to update the parameters related to a given user in order to be able to transmit personalized and adapted spontaneous content to the said user.

For this purpose, at a Stage 51, information is received concerning the identification of a moment to deliver a spontaneous content, transmitted by Terminal 5, e.g. in the form of a slot availability event. Preferably, such information is transmitted before the identified moment.

Furthermore, such information is accompanied by at least one parameter out of the set of parameters for the delivery of spontaneous contents that is appropriate to select a spontaneous content adapted to a given user of Terminal 5.

Thanks to the parameters received, the System 3 can define or update the parameters related to the said user enabling selection of spontaneous content that is personalized and adapted to the said user.

The System 3 can then, at a Stage 53, select at least one spontaneous content personalized and adapted to the user, and at Stage 55, send the selected spontaneous content(s) to Terminal 5.

It will therefore be understood that with a method of this kind, the spontaneous contents sent by the System 3 to the Terminal 5 are regularly adapted so as best to meet the needs and interests of the user of the Terminal 5, while taking into account for example specific characteristics of that user's terminal.

In regard to FIG. 4, an example (given by way of illustration and not of limitation) of a terminal and a remote system for the implementation of a method for the management of a set of parameters to deliver spontaneous content, of a method for the delivery of spontaneous contents, and of a method for the provision of spontaneous contents according to the invention will be presented below.

As can be seen on FIG. 4, Terminal 5 advantageously comprises at least one Main Management Means 7.

Preferably, such Main Management Means 7 is suitable for transmission of information concerning powering up of the Terminal 5 to the System 3, thus signaling to the System 3 that the Terminal 5 is ready to receive spontaneous contents.

System 3 judiciously comprises at least one processing means for reception of the said powering up information for Terminal 5, and to set up a authentication procedure for Terminal 5, in order to securitize the exchanges.

Once the authentication is finished and validated, Terminal 5 is ready to receive spontaneous content.

For the implementation of a method for the management of a set of parameters for the delivery of a spontaneous content according to the invention and that comprises Stages 23 to 31, the said Main Management Means 7 is able to memorize the set of parameters.

Furthermore, the said Main Management Means 7 is advantageously connected to at least one Readout Means 9 of Terminal 5 able to deliver, at Stage 23, a content to the user, e.g. by using an Application Programming Interface (API).

Judiciously, the Main Management Means 7 is also connected to at least one Interaction Management Means 11 able to:
- detect, at Stage 25, whether the user generates on his/her terminal a reaction that is favorable or otherwise to the content delivered, in order to discover, e.g., new interests for the user.
- translate the said to a representative parameter, and
- transmit such representative parameter to the Main Management Means 7.

When a reaction on the part of the user is detected, the Main Management Means 7 is then able to:
- associate at least one contextual parameter to the content delivered,
- memorize, at Stage 27, the parameter that is representative of the user's reaction, and at least one contextual parameter associated to the content delivered within the set of parameters to deliver spontaneous contact so as to adapt the latter, e.g. to the user's discovered interests.
- generate, at Stage 31, quantitative information concerning the user's reactions, and summarize them in the form of an activity report, and
- send the activity report of Terminal 5 to the System 3, e.g. on a periodic basis.

Besides, the Main Management Means 7 is advantageously connected to at least one Scheduling Means 13 capable of setting up, at Stage 29, a schedule to deliver at least one selected spontaneous content so as to determine at least one appropriate moment to deliver the said content.

Furthermore, for the implementation of a method for the delivery of spontaneous content according to the invention and comprising Stages 35 to 49, the Scheduling Means 13 is able to identify, at Stage 35, a moment to deliver a spontaneous content.

As a variant, the Main Management Means 7 is connected to at least one Monitoring Means 15 capable of monitoring an activity of Terminal 5, e.g. a hardware or software activity, in order to identify a moment to deliver a spontaneous content.

Preferably, the Monitoring Means 15 are suitable for monitoring the powering up of the Terminal 5. In that case, Terminal 5 advantageously comprises at least one processing means (not represented) that is capable of inhibiting the identification of a moment for the delivery of a spontaneous content over a predefined time interval, preferably over rest periods.

As an implementation variant, the Monitoring Means 15 are capable of monitoring a telecommunication activity of Terminal 5.

Alternatively, such Monitoring Means 15 may comprise at least one integrated or external sensor, capable e.g. of transmitting information concerning the geographic location of Terminal 5 or, indeed, temporal information.

Of course, such Monitoring Means 15 may also be suitable for detecting the delivery of spontaneous content.

Sensibly, the Scheduling Means 13 and Monitoring Means 15 are suitable for transmitting to the Main Management Means 7 information concerning the identification of a moment to deliver a spontaneous content, e.g. in the form of a slot availability event.

When the identification of a moment is determined on the basis of scheduling, the Scheduling Means is capable of transmitting such information concerning advance identification of a moment to deliver a spontaneous content.

Advantageously, the Management Means 7 has the capability to:
- receive such information concerning identification of a moment to deliver a spontaneous content, and
- check whether at least one spontaneous content is recorded.

When at least one spontaneous content is recorded, the Main Management Means 7 is then able to:
- transmit a spontaneous content selection request; such request may comprise at least one or several parameters out of the set of parameters for the delivery of spontaneous contents that are useful in order to select a spontaneous content adapted to the user, and
- transmit a request for the delivery of the selected content.

Advantageously, the Main Management Means 7 are connected to Selection Means 17 capable of receiving a selection request for spontaneous content, and capable of selecting, at Stage 37, spontaneous content available from among spontaneous content recorded e.g. in the Memorization Means 19 of the Terminal 5.

On the other hand, when there is no recorded spontaneous content, the Main Management Means 7 is able to:
- transmit to Stage 36 the information concerning the identification of a moment to deliver a spontaneous content intended for the System 3, e.g. in the form of a slot availability event, and at least one parameter out of the set of parameters for the delivery of spontaneous contents serving the selection of spontaneous content, and
- receive the spontaneous content sent by System 3 at Stage 38.

Furthermore, the Reading Means 9 are suitable for:
- receiving a request to deliver a spontaneous content, and
- delivering, at Stage 41, available content selected at Stage 37 or received at Stage 38.

Furthermore, when a spontaneous content is delivered, the Interaction Management Means 11 is able to:
- detect an interaction of the user with the spontaneous content delivered,
- generate and transmit information concerning user interaction to the Main Management Means 7.

Preferably, the Management Means 7 has the capability to:
- receive and transmit such information concerning user interaction to the System 3,
- receive information concerning the presence of additional incoming data sent by the System 3, and
- transmit a request for information from the user.

For this purpose, the Main Management Means 7 is connected to at least one Detection Means 21 able to detect a supplementary incoming data item sent by the System 3, and to transmit to the Main Management Means 7 information concerning the presence of a supplementary incoming data item.

Advantageously, the Readout Means 9 have the capability to:
- receive a request for information from the user, and
- inform the user of a supplementary incoming data item.

In that case, it can be provided for Terminal 5 to comprise at least one processing means to accept or refuse receipt of such supplementary incoming data item.

Furthermore, for purposes of the implementation of a method for the transmission of spontaneous contents over a Network 1 according to the invention comprising Stages 51 to 55, System 3 comprises, according to a preferred embodiment, at least one Processing Means to receive:
- information concerning the identification of a moment to deliver a spontaneous content, transmitted by Terminal 5, e.g. in the form of a slot availability event, and
- at least one parameter out of the set of parameters for the delivery of spontaneous contents that is appropriate to select a spontaneous content adapted to a given user of Terminal 5.

For this purpose, it can be provided for System 3 to comprise a parameter management module wherein the received parameters concerning the said user are memorized. In that case, System 3 advantageously comprises a communication interface between Terminal 5 and the parameter management module.

Advantageously, System 3 comprises at least one processing means to select at least one personalized spontaneous content adapted to the user on the basis of the parameters received.

As a variant, a service platform may be provided that would be able to select at least one personalized spontaneous content adapted to the user on the basis of the parameters relating to that user. In that case, the system advantageously comprises a communication interface between the parameter management module and the services platform.

Preferably, System 3 comprises at least one processing means to send the selected spontaneous content(s) to Terminal 5.

It will therefore be understood that the set of Parameters to deliver spontaneous content to a given user evolves on a constant basis so as always best to match the user as concerns his/her current interests at the time, and enables selection and presentation to the user of personalized and specially adapted spontaneous contents at an advantageous moment.

The invention claimed is:

1. A method for the management of a set of parameters for the delivery of spontaneous contents to a user of a terminal comprising:
   delivering at least one content to the user;
   detecting whether the user generates on his/her terminal a reaction that is favorable or otherwise to the content delivered;
   within the set of parameters for delivery of the spontaneous contents, storing to memory at least one parameter representing the said reaction on the part of the user, and at least one contextual parameter associated to the said content delivered so as to adapt the said set of parameters;
   establishing a schedule via the terminal to deliver at least one spontaneous content selected based on the said adapted set of parameters so as to determine an appropriate moment to deliver the said selected content; and
   inhibiting the identification of the moment for the delivery of the spontaneous content for a predefined time interval;
   wherein the powering up of the terminal is monitored, in order to identify at least one moment to deliver the spontaneous content.

2. The method according to claim 1, further comprising generating at least one quantitative information concerning the user's reactions so as to establish an activity report for the user.

3. A method for the delivery of spontaneous contents to a user of a terminal, implemented by the terminal and comprising:
   identifying a moment to deliver a spontaneous content;
   selecting an available spontaneous content based on a set of parameters comprising at least one parameter that is representative of a reaction on the part of the user regarding a content delivered, and at least one contextual parameter associated to the said content delivered; and delivering the selected content at the identified moment to the terminal; and inhibiting the identification of the moment for the delivery of the spontaneous content for a predefined time interval;

wherein the powering up of the terminal is monitored, in order to identify at least one moment to deliver the spontaneous content.

4. The method according to claim 3, further comprising transmitting information concerning the identification of a moment to deliver a spontaneous content, so as to permit the user terminal to receive spontaneous contents to be delivered.

5. The method according to claim 3, further comprising identifying a moment to deliver a spontaneous content based on a schedule to deliver at least one spontaneous content, and wherein the information concerning the identification of the said moment is transmitted before the identified moment.

6. The method according to claim 3, further comprising monitoring the telecommunications activity of a terminal, in order to identify at least one moment to deliver a spontaneous content.

7. A method for the transmission over a network of spontaneous contents to a user's terminal, comprising:

receiving information concerning the identification of a moment to deliver a spontaneous content, the information being transmitted before the identified moment;

receiving at least one parameter out of a set of parameters for the delivery of spontaneous contents;

selecting a spontaneous content based on the received parameters; and transmitting the selected spontaneous content is transmitted to the terminal; and inhibiting the identification of the moment for the delivery of the spontaneous content for a predefined time interval;

wherein the powering up of the terminal is monitored, in order to identify at least one moment to deliver the spontaneous content.

8. A communication terminal comprising at least one processor configured to:

deliver at least one content;

detect whether the user generates on his/her terminal a reaction that is favorable or otherwise to the content delivered;

store to memory, within a set of parameters for delivery of the spontaneous contents, at least one parameter representing the said reaction on the part of the user, and of at least one contextual parameter associated to the said content delivered so as to adapt the set of parameters;

define a schedule to deliver at least one spontaneous content selected based on the said adapted set of parameters so as to determine at least one appropriate moment to deliver the said selected content; and inhibit the identification of the moment for the delivery of the spontaneous content over a predefined time interval; and a monitoring component that monitors powering up of the terminal in order to identify at least one moment to deliver the spontaneous content.

9. A network communication terminal comprising at least one processor configured to:

identify of a moment to deliver a spontaneous content;

select an available spontaneous content based on a set of parameters comprising at least one parameter that is representative of a reaction on the part of the user regarding a content delivered, and at least one contextual parameter associated to the said content delivered;

deliver the selected content at the identified moment; and inhibit the identification of the moment for the delivery of the spontaneous content over a predefined time interval; and a monitoring component that monitors powering up of the terminal in order to identify at least one moment to deliver the spontaneous content.

10. A remote system suitable to deliver spontaneous contents comprising at least one processor configured to:

receive information concerning the identification of a moment to deliver a spontaneous content is received, the information being transmitted before the identified moment;

receive at least one parameter out of a set of parameters for the delivery of spontaneous contents;

select a spontaneous content based on the said received parameters; and transmit, over a network, the selected spontaneous content; and inhibit the identification of a moment for the delivery of a spontaneous content over a predefined time interval; and a monitoring component that monitors powering up of the terminal in order to identify at least one moment to deliver the spontaneous content.

* * * * *